United States Patent Office 2,918,789
Patented Dec. 29, 1959

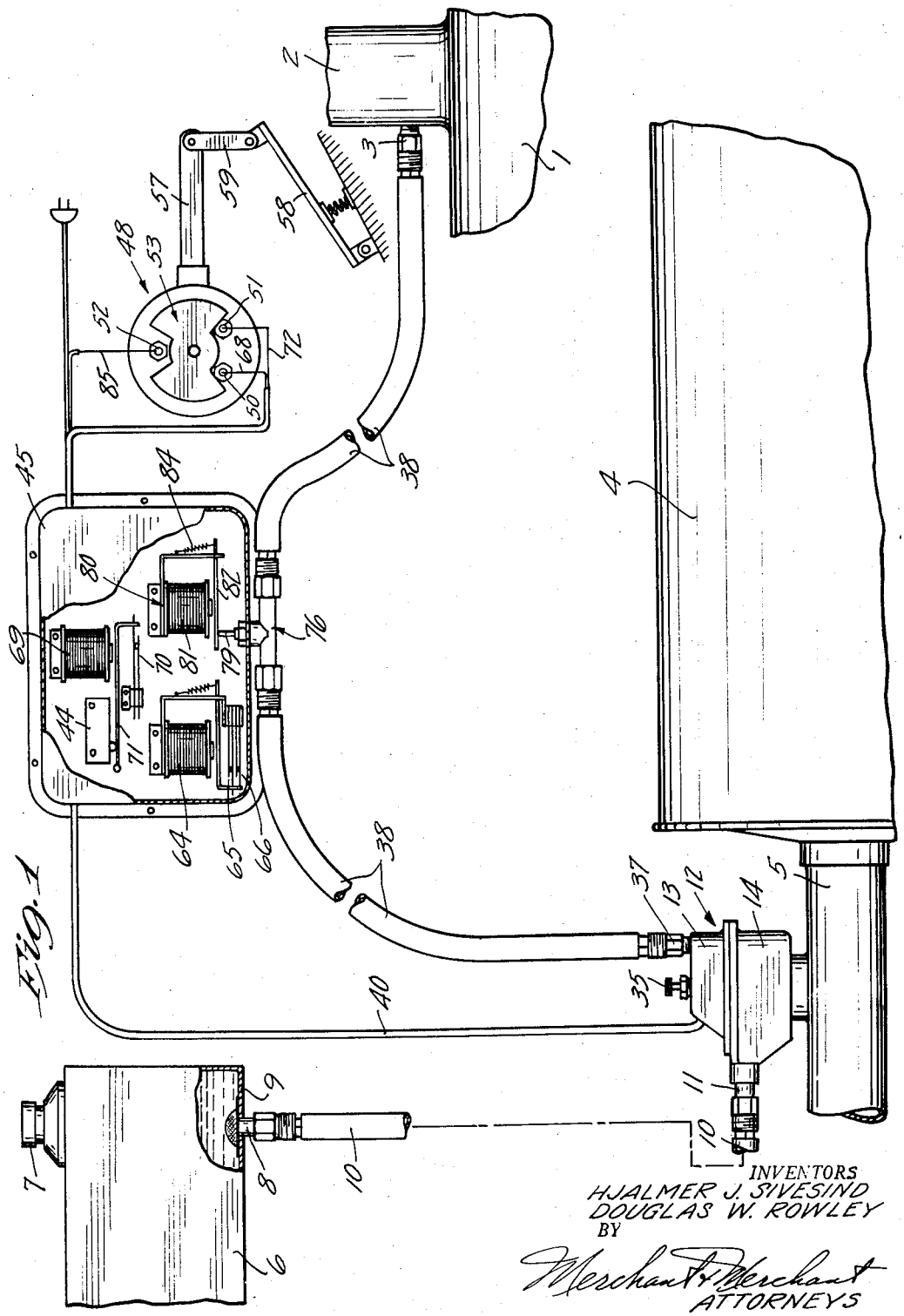

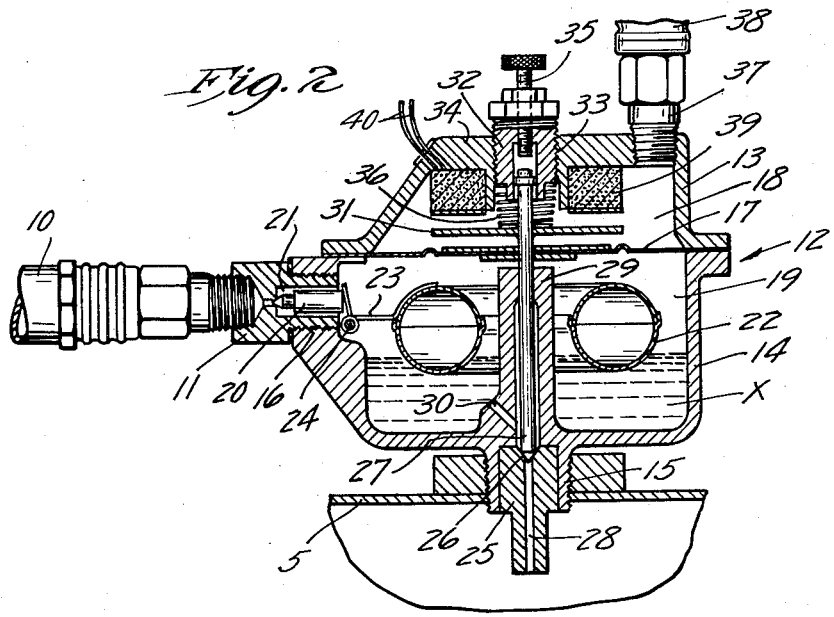
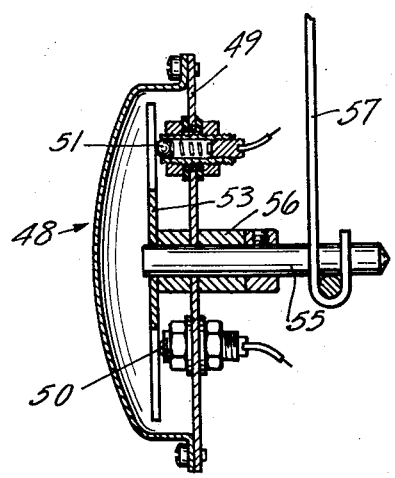
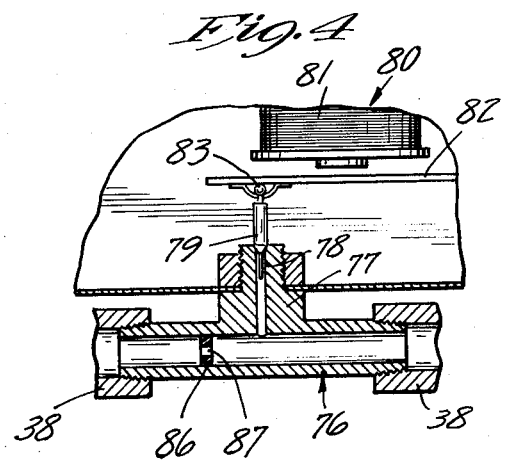
INVENTORS
HJALMER J. SIVESIND
DOUGLAS W. ROWLEY
BY
*Merchant & Merchant*
ATTORNEYS

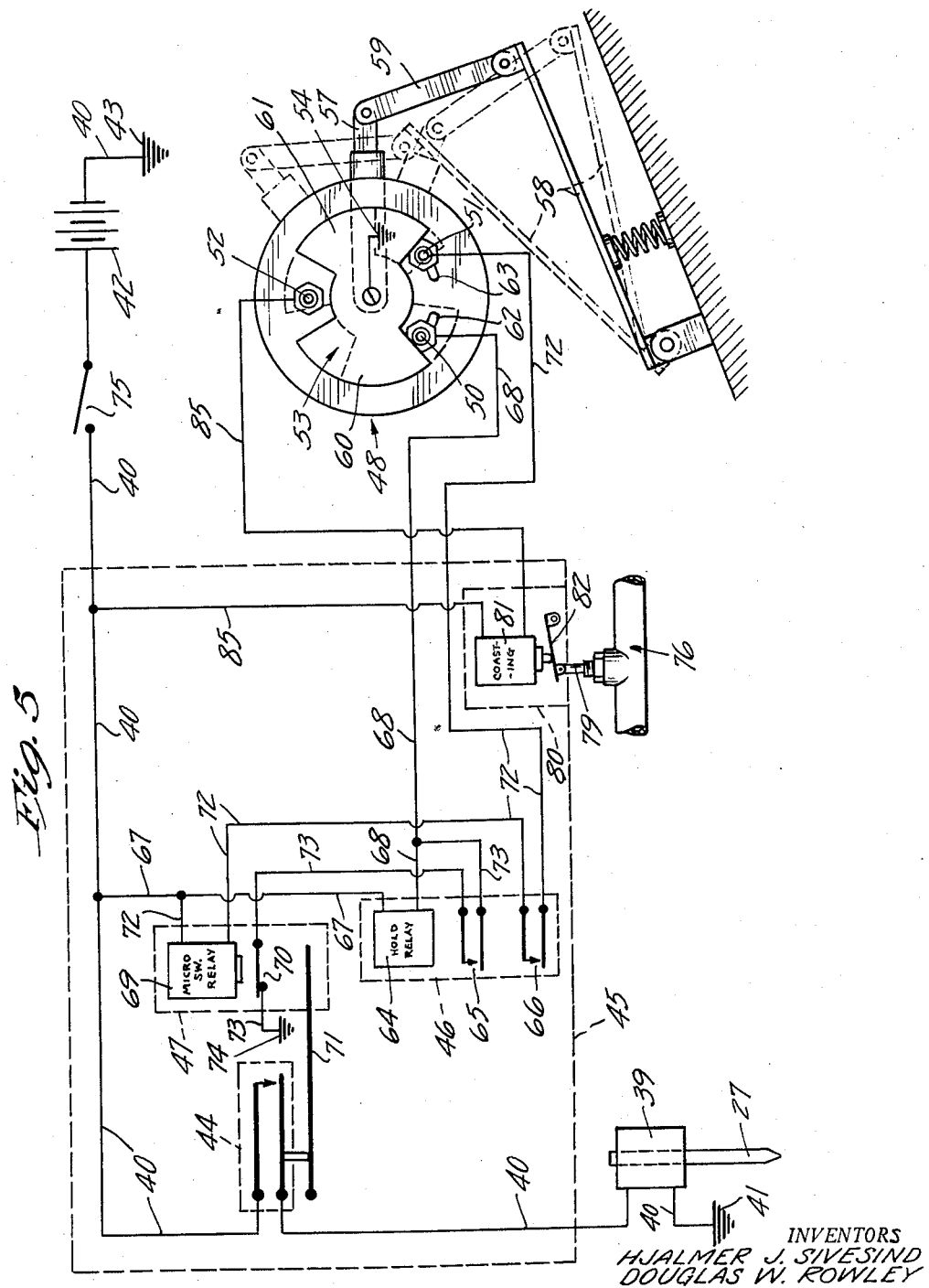

2,918,789

APPARATUS FOR DEODORIZING EXHAUST GASES FROM INTERNAL COMBUSTION ENGINES

Hjalmer J. Sivesind, River Falls, Wis., and Douglas W. Rowley, St. Paul, Minn., assignors to Donaldson Company, Inc., St. Paul, Minn., a corporation of Delaware Application March 4, 1957, Serial No. 643,695

8 Claims. (Cl. 60—30)

Our invention relates generally to the deodorization or reodorization of exhaust gases from internal combustion engines, and removing the obnoxious odors therefrom before the gases are discharged to atmosphere.

More specifically, our invention relates to automatic mechanism for adding deodorant fluid to the exhaust system of an internal combustion engine, and for novel means for controlling the rate of flow of said fluid to the exhaust system under different operating conditions of the engine.

It is well known that, in internal combustion engines, particularly diesel engines utilized in propelling automotive vehicles such as buses and trucks, objectionable exhaust odors are primarily caused by unburned fuel. Inasmuch as the fuel-air mixture is much richer when the vehicle is started from a stationary condition, or under acceleration, than when cruising at a given speed and over a relatively level road, a much higher proportion of the fuel is unburned or only partially consumed during accelerating periods or periods of heavy load than at normal even cruising speeds. Further, at low engine speed, combustion efficiency is low. During deceleration, in engines using fuel injection systems, such as diesel engines, fuel is cut off or fed to the combustion chamber at a much lower rate than at cruising speeds or during acceleration, hence the offensive odor of exhaust gases is greatly minimized under deceleration.

Several fluid substances have been developed and are adapted to be injected into the exhaust systems of internal combustion engines for the purpose of neutralizing or obliterating the odors of exhaust gases. Some of these fluids have distinct odors of their own which, when these fluids are mixed with the exhaust gases in given proportions, lose their own identity while neutralizing the odor of the exhaust gases.

The primary object of our invention is the provision of novel means for automatically feeding deodorant or reodorant fluid to the exhaust system of an internal combustion engine in such proportions that the odors will be effectively removed from the exhaust gases under varying conditions of engine operation.

Another important object of our invention is the provision of novel control mechanism whereby the rate of feed of deodorant fluid to the exhaust system varies to meet changes in the requirements of the exhaust gases without an appreciable time lag between such requirement changes and variation in the proportion of such fluid.

Another object of our invention is the provision of relatively simple and inexpensive feeding and control mechanism of the type set forth which is easily adapted for mounting in vehicles of different makes of manufacture and having engines of various sizes.

Still another object of our invention is the provision of apparatus as set forth which is quickly and easily adjustable to meet the requirements of a wide variety of engines.

Another object of our invention is the provision of novel control means adapted to be connected to the intake system of an engine, and of other control means adapted to be coupled to the throttle mechanism of the engine whereby delivery of deodorant fluid to the exhaust system of the engine is controlled to a relatively fine degree.

Still another object of our invention is the provision of novel means for utilizing negative intake manifold pressure for controlling delivery of deodorant fluid to the exhaust system under given operating conditions of the engine, and of means for automatically reducing the effect of the negative manifold pressure on said first mentioned means under other given operating conditions of the engine, whereby to cut off delivery of deodorant fluid to the exhaust system when such delivery is not required.

The above and still further objects of our invention will become apparent from the following detailed specification, appended claims, and attached drawings.

Referring to the drawings, which illustrate the invention, and in which like characters indicate like parts throughout the several views;

Fig. 1 is a view partly in side elevation and partly in diagram, with some parts being broken away and some parts shown in section illustrating a typical installation of our novel apparatus as applied to the intake and exhaust systems of an internal combustion engine and throttle mechanism therefor;

Fig. 2 is a fragmentary vertical section of a valve of our invention and control means therefor;

Fig. 3 is a fragmentary axial section of the throttle operated control switch of our invention;

Fig. 4 is an enlarged fragmentary detail partly in side elevation and partly in section of a pressure releasing valve incorporated in our invention; and Fig. 5 is a wiring diagram.

Referring with greater detail to the drawings, and more particularly to Fig. 1, the numeral 1 indicates a conventional intake manifold of an internal combustion engine, not shown, to an upwardly extending portion 2 of which is connected a conduit fitting or the like 3 for a purpose which will hereinafter become apparent. It may be assumed that the upper end of the manifold portion 2 communicates with atmosphere through the usual air filter, not shown. In the event that the engine is of the conventional gasoline operated variety, it may be assumed that the upwardly extending portion 2 is connected to the conventional air filter and carburetor of the engine. The numeral 4 indicates a muffler for the gases of the combustion, said muffler being of conventional design and having extending rearwardly therefrom a tail pipe 5 through which the exhaust gases pass to atmosphere. Inasmuch as the intake manifold 1 and muffler 4 with its tail pipe 5 do not in themselves comprise the instant invention, the same are not shown nor described in detail.

Our novel apparatus comprises a source of deodorant fluid such as a storage tank 6 having a filler cap or the like 7 at its top and an outlet fitting 8 in the bottom wall 9 of the tank. A delivery conduit 10 has one end secured to the outlet fitting 8, and its other end secured to an inlet fitting 11 of a valve casing, indicated in its entirety by the numeral 12. The valve casing comprises upper and lower casing sections 13 and 14, the latter of which is provided with a fitting 15 that is screw threaded into the tail pipe 5. With reference particularly to Figs. 1 and 2 it will be seen that the fitting 11 is screw threaded into a threaded opening 16 in the lower casing section 14, and that a relatively thin flexible diaphragm 17 is interposed between the valve casing sections 13 and 14. The diaphragm 17 cooperates with the upper casing section 13 to define an upper chamber 18, and with the lower casing section 14 to define a float chamber 19. The fitting 11 defines a seat for a float valve element 20 axially slidable in a recess 21 in the fitting 11. An annular float 22 is carried by one arm of an L-shaped bracket 23 that is pivotally secured within the chamber 19 as indicated at 24. The other arm of the bracket 23 engages the float valve element 20 to close the same when a predetermined amount of fluid is contained within the chamber 19. Preferably, the supply tank 6 is locked in an elevated position with respect to the chamber 19 so that fluid, preferably in liquid form and indicated by the reference character "X," will flow to the chamber 19 under the action of gravity.

A valve seat insert 25 is rigidly mounted in the fitting 15 and is formed to provide a seat 26 for a needle valve element 27, and an outlet passage 28 leading from the valve seat 26 to the interior of the tail pipe 5. The needle valve element 27 is rigidly secured to the internal portion of the diaphragm 17 and extends downwardly therefrom to the valve seat 26 through a central tubular guide member 29 integrally formed with the lower casing section 14. A fluid passage 30 extends through the lower end portion of the guide member 29 whereby to deliver fluid X from the float chamber 19 to the valve seat 26. The needle valve element or stem 27 is provided above the diaphragm 17, with an annular flange 31 that is made from ferrous metal such as soft steel. A tubular, externally threaded sleeve 32 is screw threaded into a central opening 33 in the top wall 34 of the casing section 13 and provides a guide for the upper end of the middle valve element or stem 27. A lock nut equipped stop screw 35 is screw threaded in the upper end of the guide sleeve 32 and limits upward valve opening movement of the needle valve element 27. Interposed between the lower end portion of the guide sleeve 32 and the annular flange 31 is a coil compression spring 36 which yieldingly urges the needle valve element 27 into valve closed seating engagement with the valve seat 26. As will hereinafter be more fully explained, adjustment of the stop screw 35 varies the degree of valve opening movement of the needle valve element 27.

A conduit fitting 37 is screw threaded into the top wall 34 of the casing section 13 adjacent one side thereof, and has connected thereto one end of an air conduit 38, the other end of which is secured to the fitting 3, whereby the chamber 18 is subject to negative pressure generated in the intake manifold 1. Under normal cruising speeds of a vehicle to which the apparatus is applied, the negative intake manifold pressure is such that the needle valve element 27 will be raised by the diaphragm 17 against bias of the spring 36 sufficiently to allow flow of fluid X through the discharge passage 28 to the interior of the tail pipe 5 at a rate which will cause deodorization of the exhaust gases as the liquid X evaporates in the tail pipe 5. Raising or lowering of the threaded sleeve 32 will vary the yielding bias of the spring 36 so that the needle valve element or stem 27 will open responsive to a given negative manifold pressure. Inasmuch as the negative intake manifold pressure in a given engine varies to a high degree under different operating conditions, such as under acceleration and deceleration, resulting in a considerable variation in the quantity of unburned or partially burned fuel in the exhaust system of the engine, we provide further means for controlling movement of the needle valve element 27, now to be described.

Mounted in the upper chamber 18 of the valve casing 12 is a solenoid coil in upwardly spaced concentric relation to the annular flange 31. The flange 31, in its valve closed position, is within the magnetic field of the solenoid coil 39 and is responsive to energization of the coil 39 to raise the needle valve element 27 independently of partial vacuum or negative pressure within the chamber 18. The coil 39 is interposed in a lead 40 that is grounded as at 41, and which is connected to one side of a source of current such as a battery 42, the other side of which is grounded as indicated at 43. A control switch 44 is interposed in the lead 40, and is mounted within a control box 45 which may be assumed to be rigidly secured in the engine compartment of a vehicle. The switch 44 is preferably of the miniature variety commonly known as a "microswitch" and is normally open. The switch 44 is controlled by electrical means including a pair of relays 46 and 47 and a manually operated switch 48 that is coupled to the throttle mechanism of the engine. As shown in Figs. 1, 3 and 5, the switch 48 includes a housing 49 in which is mounted a plurality of relatively fixed contact elements 50, 51 and 52, and a relatively movable disc-like contact element 53 that is grounded as indicated at 54, see Fig. 5. The relatively movable contact 53 is rigidly mounted on a rotary shaft 55 journaled in a bearing 56 in the switch housing 49, and at its outer end has rigidly secured thereto a switch operating arm 57 that is shown as being connected to the conventional foot operated throttle control pedal 58 usually found in automotive vehicles by means of a link 59. The relatively movable switch contact 53 is formed to provide a pair of circumferentially spaced segmental portions 60 and 61 between which are located the relatively thick contact elements 50, 51 and 52. With reference particularly to Fig. 5 it will be seen that the contact elements 50 and 51 are mounted in circumferentially extended slots 62 and 63 respectively in the switch housing 49 for adjustment circumferentially thereof.

The relay 46 comprises a relay coil 64 and a pair of normally open switches 65 and 66, the coil 64 being interposed in a circuit comprising a portion of the lead 40, a lead 67 extending from the power lead 40 to the coil 64, and a lead 68 extending from the coil 64 to the contact element 50 of the switch 48. The relay 47 comprises a relay coil 69 and a normally closed switch 70, the coil 69, when energized, causing movement of a switch operating arm 71, mounted in the control box 45 in a direction to close the microswitch 44. The coil 69 of the relay 47 is connected in series with the switch 66 of the relay 46 by means of a lead 72 connected at one end to the power lead 40 through a portion of the lead 67, and at its other end to the switch contact 51. A holding circuit for the relay coil 64 is formed by the switches 65 and 70 connected in series by a lead 73 connected at one end to the lead 68 and grounded at its other end as indicated at 74.

For the purpose of the present example, we have shown a master control switch 75 which may, if desired, comprise the ignition switch for the engine, not shown. Assuming that the engine is in an inoperative condition, the movable switch element 53 and its connections to the throttle control pedal 58 are positioned as indicated by dotted lines in Fig. 5. In this position, the segmental portion 60 of the movable contact element 53 engages the contact element 50 to cause energization of the relay coil 64 when the switch 75 is closed. When initiating operation of the engine, and when starting the vehicle from a standstill, the operator depresses the throttle control pedal 58 to feed sufficient fuel to the engine to cause acceleration in the speed thereof. When this occurs, the movable switch contact element 53 will be rotated in a direction to cause the segmental portion 61 thereof to engage the stationary contact 51 and break the connection between the segmental portion 60 and the stationary contact element 50. Inasmuch as the relay coil 64 is held energized through the serially connected switches 65 and 70, engagement of the switch contact 51 by the segmental portion 61 will cause energization of the relay coil 69 to deenergize the coil 64 and to close the switch 44 thereby causing the solenoid 39 to be energized. It will be here noted that deenergization of the relay coil 64 due to opening of the switch 70 causes opening of the switch 66 and resulting deenergization of the relay coil 69. Obviously when the relay coil 69 is deenergized the switch 44 is caused to reopen, thereby deenergizing the solenoid coil 39. Thus it will be seen that energization of the relay coil 69 and solenoid 39 is but momentary, and the needle valve element 27 is raised from seating engagement with the valve seat 26 for but a very brief time interval. This time interval is governed by the distance traveled by the needle valve element 27 permitted by stop screw 35, and as above indicated, this distance is varied by adjustment of the stop screw 35. During the time that the delivery valve is open deodorant fluid or solution is fed to the interior of the tail pipe 5 in sufficient quantity to completely deodorize the unburned or partially burned exhaust gases passing through the tail pipe 5 to atmosphere. These gases, being relatively warm, cause rapid evaporation of the deodorant fluid in the tail pipe and the vaporized deodorant becomes mixed with the exhaust gases before the same are discharged to atmosphere. It will be appreciated, as above indicated, that during low engine speed and rapid acceleration, complete combustion of the fuel does not take place. Thus it is necessary that, during such acceleration a quantity of the deodorant fluid substantially greater than normal be injected into the tail pipe during the accelerating period to completely deodorize the unburned exhaust gases.

As above indicated, in the crusing range, when the engine is operating at a relatively constant rate, the negative intake manifold pressure causes the needle valve element 27 to be opened to a degree wherein but a relatively small amount of fluid X is delivered to the tail pipe 5 to deodorize the relatively small quantity of unburned gases. In a relatively clean, well tuned engine, the proportion of unburned or partially burned gases exhausted at the above-mentioned cruising speed will be relatively small. Inasmuch as it is difficult to maintain an engine in perfect running condition over an extended period of time, some unburned or partially burned gases will be exhausted even at cruising speed, when the engine is operating under a very light load. Hence, the compressive force of the spring 36 in the chamber 18 is adjustable to vary the flow of fluid X to the tail pipe 5. During deceleration of engine speed, and when the engine is utilized as a braking means for a vehicle, when the same is traveling on a downgrade, the engine is utilizing a relatively large quantity of air and a relatively small quantity of fuel. In some instances the supply of fuel is completely shut off. In this operating condition of the engine, any fuel used is substantially totally consumed, and it is desirable during this period that the flow of fluid X to the tail pipe be entirely shut off in order to avoid waste of deodorant fluid. Furthermore, the deodorant fluid usually has its own distinctive odor which is neutralized when the fluid mixes with unburned gases in the tail pipe, and it is desired that no appreciable odor be contained in the exhaust gases when discharged to atmosphere. During deceleration of engine speed, and when the engine is used as a brake, the negative intake manifold pressure tends to raise the needle valve element 27 to cause delivery of fluid. For the purpose of maintaining the needle valve element in its closed position during these operating conditions, we provide a pressure releasing valve 76 that is interposed in the conduit 38, and which comprises a valve casing 77 defining a valve 78 and a valve stem 79 movable into and out of engagement with the valve seat. As shown in Figs. 1 and 4, the valve 76 is mounted on the control box 45, and is operated by means of a solenoid 80 comprising a coil 81 and a cooperating armature 82 to which is connected the upper end of the valve stem 79, as indicated at 83. With reference to Fig. 1 it will be seen that a coil tension spring 84 yieldingly biases the armature 82 in a direction to close the valve 76. The solenoid coil 81 is interposed in a lead 85 which extends from the power lead 40 to the relatively fixed switch contact 52 of the throttle mechanism operated switch 48. At normal cruising speeds, the solenoid coil 81 is deenergized and the spring 84 urges the valve stem 77 towards its valve closed position to permit the negative intake manifold pressure to affect the diaphragm 17 and needle valve element 27.

When the operator wishes to cause the engine to decelerate, he removes his foot from the pedal 58, and the movable switch contact element 53 moves to its dotted line position of Fig. 5 to close the circuit through the solenoid coil 81. Obviously, energization of the coil 81 will cause the armature 82 to open the valve 76 and relieve the negative pressure in the conduit 38 and chamber 18. This time, the needle valve element or stem 27 will remain seated on the valve seat 26 and no deodorant fluid X will be delivered to the tail pipe 5 during this operating condition of the engine.

Due to the fact that, in internal combustion engines, air is drawn into the several combustion chambers from the intake manifold at intervals, and not in a steady stream, pressure pulsations are set up in the intake manifold 1. In order to prevent these pressure pulsations from imparting a pulsating movement or flutter to the diaphragm 17, we provide restricting means in the nature of a bushing 86 in the valve 76 between the chamber 19 and the intake manifold 1, see Fig. 4. The bushing 86 is provided with a central orifice 87 which restricts the flow of air in both directions, and reduces the pressure pulsations set up in the manifold 1 to a degree that the diaphragm 17 is unaffected by such pulsations, and the diaphragm is responsive only to the average negative intake manifold pressure existent in the intake manifold 1 during a given period of operation.

Our invention has been thoroughly tested and found to be completely satisfactory for the accomplishment of the objectives set forth; and while we have shown and described a commercial embodiment of our novel apparatus, it will be understood that the same is capable of modification without departure from the spirit and scope of the invention as defined in the claims.

What we claim is:

1. Apparatus for adding deodorant fluid to the exhaust system of an internal combustion engine having throttle mechanism for controlling engine speed, said apparatus comprising, a source of deodorant fluid, conduit means including a valve for effecting communication between said source and said exhaust system, a fluid pressure responsive valve operating device adapted to be connected to the intake system of said engine and operative to cause opening of said valve when a predetermined negative intake manifold pressure is generated by said engine, electrically operated mechanism including an electromagnetic coil operative to open said valve independently of said manifold pressure, and a switch for said electromagnetic coil, said switch being adapted to be coupled to said throttle mechanism and being responsive to movement thereof in a direction causing acceleration of engine speed to energize said electromagnetic coil to open said valve.

2. Apparatus for adding deodorant fluid to the exhaust system of an internal combustion engine having throttle mechanism for controlling engine speed, said apparatus comprising, a source of deodorant fluid, conduit means including a valve for effecting communication between said source and said exhaust system, said valve comprising a housing defining a chamber and a valve element in said chamber, a fluid pressure responsive device in said chamber and connected to said valve element for moving the same between a valve closed position and a valve open position, a conduit communicating with said chamber and adapted to be connected to the intake system of said engine, whereby to expose said pressure responsive device to the negative manifold pressure of said engine to cause opening of said valve to varying degrees determined by said manifold pressure, electrically operated mechanism including an electromagnetic coil operative to cause movement of said valve element toward its open position independently of said manifold pressure, and a switch for said electromagnetic coil, said switch being adapted to be coupled to said throttle mechanism and being responsive to movement thereof in a direction causing acceleration of engine speed to energize said electromagnetic coil to open said valve.

3. The structure defined in claim 2 in further combination with stop means limiting movement of said valve element in a valve open direction, said stop means being adjustably movable in opposite directions to vary the limit of movement of said valve element.

4. The structure defined in claim 2 in which said electrically operated mechanism further includes a cutoff switch for said electromagnetic coil, and means controlled by said first-mentioned switch for operating said cutoff switch to de-energize said coil immediately after energization thereof, whereby said valve is fully opened only momentarily, said valve being controlled only by said fluid pressure responsive element upon de-enerization of said electromagnetic coil.

5. Apparatus for adding deodorant fluid to the exhaust system of an internal combustion engine having throttle mechanism for controlling engine speed, said apparatus comprising a source of deodorant fluid, conduit means including a valve for effecting communication between said source and said exhaust system, a fluid pressure responsive valve operating device, a conduit for connecting said valve operating device to the intake system of said engine, said device being operative to cause opening of said valve when a predetermined negative intake manifold pressure is generated by said engine, a pressure-releasing valve in said conduit operative to cause communication between the interior of said conduit and the ambient atmosphere, electrically controlled valve operating mechanism coupled to said pressure releasing valve to open and close the same, and circuit means including a switch adapted to be coupled to said throttle mechanism for controlling said valve operating mechanism to cause a reduction in the effective negative manifold pressure on said valve operating device under predetermined operating conditions of said engine and closing of said first mentioned valve.

6. Apparatus for adding deodorant fluid to the exhaust system of an internal combustion engine having throttle mechanism for controlling engine speed, said apparatus comprising, a source of deodorant fluid, conduit means including a fluid valve for effecting communication between said source and said exhaust system, a fluid pressure responsive valve-operating device, a conduit for connecting said valve operating device to the intake system of said engine, said device being operative to cause opening of said valve when a predetermined negative intake manifold pressure is generated by said engine, a pressure releasing valve in said conduit operative to cause communication between the interior of said conduit and the ambient atmosphere, electrically operated mechanism including an electromagnetic coil operative to open said fluid valve independently of said manifold pressure, a switch adapted to be coupled to said throttle mechanism, and electrically controlled valve operating mechanism coupled to said pressure releasing valve to open and close the same, movement of said switch by said throttle mechanism in a direction to increase engine speed causing energization of said electromagnetic coil to open said fluid valve independently of the negative manifold pressure, movement of said switch by said throttle mechanism in a direction to reduce engine speed causing said valve operating mechanism to open said pressure releasing valve to reduce the effective negative manifold pressure on said valve operating device.

7. In combination with an internal combustion engine having intake and exhaust systems and throttle mechanism for controlling engine speed, a source of deodorant fluid, conduit means connected at one end to said source and including a valve connected to said exhaust system for effecting communication between said source and said exhaust system, a fluid pressure responsive device operatively coupled to said valve, a conduit connected to the intake system of said engine for effecting communication therebetween and said valve operating device, said device being operative to cause opening of said valve when a predetermined negative intake manifold pressure is generated by said engine, a pressure releasing valve interposed in said conduit and operative to effect communication between the interior of said conduit and the ambient atmosphere, electrically controlled valve operating mechanism coupled to said pressure releasing valve to open and close the same, and circuit means including a switch operatively coupled to said throttle mechanism for controlling said valve operating mechanism to cause a reduction in the effective negatvie manifold pressure on said valve operating device, under predetermined operating conditions of asid engine, and closing of said first-mentioned valve.

8. In combination with an internal combustion engine having intake and exhaust systems and throttle mechanism for controlling engine speed, a source of deodorant fluid, conduit means connected at one end to said source and including a fluid valve connected to the exhaust system of said engine for effecting communication between said source and said exhaust system, said fluid valve including a housing defining a chamber, a valve element in said chamber, yielding means biasing said valve element toward a valve closed position, a pressure responsive device connected to said valve element for moving same toward its valve open position against bias of said yielding means, a conduit communicating with said chamber and connected to the intake system of said engine to expose said pressure responsive device to the negative manifold pressure of said engine to cause opening of said valve to varying degrees determined by said manifold pressure, electrically operated mechanism including an electro-magnetic coil operative to cause movement of said valve element towards its open position independently of said manifold pressure, a pressure releasing valve in said conduit between said intakte system and said pressure responsive device and operative to effect communication between the interior of said conduit and the ambient atmosphere, electrically controlled valve operating mechanism coupled to said pressure releasing valve to open and close the same, and circuit means including a switch operatively coupled to said throttle mechanism, movement of said switch by said throttle mechanism in a direction to increase engine speed causing energization of said magnetic coil to open said fluid valve independently of the negative manifold pressure, movement of said switch by said throttle mechanism in a direction to reduce engine speed causing said valve operating mechanism to open the pressure releasing valve to reduce the effective negative manifold pressure on said valve operating device.

References Cited in the file of this patent

UNITED STATES PATENTS

| | | |
|---|---|---|
| 1,179,145 | Southern | Apr. 11, 1916 |
| 2,628,634 | Glover | Feb. 17, 1953 |